US012148587B2

(12) United States Patent
Wang et al.

(10) Patent No.: US 12,148,587 B2

(45) Date of Patent: Nov. 19, 2024

(54) MANUFACTURE METHOD OF A CONCAVE DISC-SHAPED STRUCTURE OF BIMETAL STRIP

(71) Applicants: Yi-Hsiang Wang, Taoyuan (TW); I-Ying Wang, Taoyuan (TW)

(72) Inventors: Yi-Hsiang Wang, Taoyuan (TW); I-Ying Wang, Taoyuan (TW)

( * ) Notice: Subject to any disclaimer, the term of this patent is extended or adjusted under 35 U.S.C. 154(b) by 472 days.

(21) Appl. No.: 17/511,935

(22) Filed: Oct. 27, 2021

(65) Prior Publication Data

US 2022/0139652 A1 May 5, 2022

(30) Foreign Application Priority Data

Oct. 29, 2020 (TW) ................................ 109137604

(51) Int. Cl.
*H01H 37/52* (2006.01)
*H01H 37/04* (2006.01)

(52) U.S. Cl.
CPC ............ *H01H 37/52* (2013.01); *H01H 37/04* (2013.01); *H01H 2037/525* (2013.01)

(58) Field of Classification Search
CPC ...... H01C 7/126; H01H 37/761; H01H 71/16; H01H 71/18; H01H 73/26; H01H 83/20; H01H 85/08; H01H 85/175; H01H 89/04; H01H 9/0271; H01H 9/042; H01L 27/0629; H01L 29/94; H01L 27/0207; H01L 21/823437; H01L 21/823475
See application file for complete search history.

(56) References Cited

U.S. PATENT DOCUMENTS 7,248,140 B2 * 7/2007 Yu .......................... H01H 73/26 337/72
2017/0148601 A1 * 5/2017 Wang .................. H01H 9/0271
2022/0139652 A1 * 5/2022 Wang .................... H01H 37/04 337/362

* cited by examiner

*Primary Examiner* — Minh N Trinh
(74) *Attorney, Agent, or Firm* — Rosenberg, Klein & Lee

(57) ABSTRACT

A manufacture method of a concave disc-shaped structure of bimetal strip, particularly to one that is a coaxial positioning method of the guide hole which having elastic disc-shape structure bimetal strips not affected by external stress, which having a bimetal structure which outer edge will not be damaged and does not affect by stress while inner edge pulling closed to the outer edge, it includes: a bimetal strip, a lug, and an assembling jig, having two displaceable positioning holes, and use the guiding surface to make the two positioning holes gradually turn inside to condense to the combining surface of the lugs, so as to achieve the purpose of accurate positioning and combination.

5 Claims, 12 Drawing Sheets

MANUFACTURE METHOD OF A CONCAVE DISC-SHAPED STRUCTURE OF BIMETAL STRIP

BACKGROUND OF THE INVENTION

1. Field of the Invention

The present invention relates to a manufacture method of a concave disc-shaped structure of bimetal strip, particularly to one that has a displaceable positioning hole located on the inner edge arranged on two guiding pins, and the guiding surface is used to condense during pressing down so that the assembling hole at the outer edge can be inserted into the rivet to be riveted and combined for positioning.

2. Description of the Related Art

The conventional push button switch with light for general indoor use, which is a see saw switch, when either end of the block is pressed, the bump at the bottom end pushes a spring sheet to contact the see saw to form a on or off state; however, it is found that this structure is a passive switch structure. Each change of the on or off state must cooperate with a pressing action, otherwise the on state is still on, so there is no function of automatic switching, and when the switch is in the on state and the power is overload, because it does not have the automatic trip function, it is very easy to cause the short circuit; therefore, there is a safety risk in use.

The bimetal strip is a composite material composed of two or more metals or other materials with suitable properties, bimetal strip is also known as thermal bimetal strip, two strips have two different expand rates. when they are heated, the different expansions force the flat strip to bend one way.

In the earlier prior art, it is disclosed that the contact spring leaf composed of bimetal strip will trip when the temperature rises to the trip temperature (generally set to 100° C.-150° C.) when overloaded, to avoid short circuit. Such structure can be found in Taiwan patent applications No. 398674.

Referring to FIGS. 1A-2B, Taiwan patent applications No. 398674 provides a safety switch with protection circuit, the disc-shaped bimetal strip is formed by condensation method instead of the conventional stamping, and uses condensation to form a natural curvature, which has the effect of two-way tripping. Characterized in that the bimetal strip is extended with a contacting plate 72 at the free end centrally. The contacting plate 72 is provided with an opening 721 at the tail portion thereof for positioning the platinum conductive boss 71. The positioning end is provided with a slit T1 centrally and which is provided with a pair of positioning holes 73 at both sides along the slit T1. As clearly shown in FIG. 1B, the positioning end is then moved close to the slit T1 such that the original width W1 is narrowed to new width W2. By this arrangement, the alloy plate 7 has a wider free end while has a comparative narrow positioning end; As shown in FIGS. 2A and 2B, The alloy plate 7 is attached to the bending portion 51 of the second conductive plate 5 and the positioning hole 73. The alloy plate 7 is made from a thin metal sheet and the contacting plate 72 disposed centrally is provided with a slit T2 in both side and tail portions. When the alloy plate 7 is shrunk to the narrower width W2 at its positioning end, a curvature will be naturally formed by its internal stress. Accordingly, the curvature can be formed naturally instead of forming a convex contacting plate with conventional pressing process. Since no mechanic force is applied to the alloy plate 7, no internal stress is constrained within the alloy plate, accordingly, the deforming curvature resulted from temperature rising as electric current flows through it will be remained unchanged. On the other hand, the ratio between the width W1 of free end and the width W2 of positioning end can be specially arranged such that the alloy plate 7 can be provided with bi-directional switching functions, as shown in FIG. 2A, it can be transformed into a concave shape. When the alloy plate 7 is transformed into a concave shape, the contacting plate 72 is automatically extended downward according to principle of force. To the contrary, as shown in FIG. 2B, when the alloy plate 7 is transformed into a convex shape, the contacting plate 72 is extended upward such that the platinum conductive boss 71 at tail portion thereof is accordingly moved upward. The free end of the alloy plate 7 is further provided with an opening 75. By this arrangement, when the electric current flows through the alloy plate 7, the alloy plate 7 will be automatically deformed in the contrary position such that the contacting plate 72 is disconnected and the system is kept in opened circuit to ensure the safety.

However, when narrowing the positioning end of the alloy plate 7 smaller than width W2, the method is to stamp two symmetrical notches 76 on both sides of the positioning end in advance, and then use a tool 77 to push inward from the notches 76 on both sides of the positioning end, with the notch 76 located on the outer edge of the alloy plate 7 for inward movement, the notch 76 is aligned with the guide blade seat and pushed inwardly when pressed parallel, so that the positioning hole 73 at the inner edge enters the rivet column 78 for riveting and positioning, and then the positioning hole 73 of the positioning end of the disc-shaped alloy plate 7 is condensed and fixed on the bending body 51 of the second lug 5, and a convex extension control piece 75 on the free end is used as a control for on/off switching action; However, this kind of compression combination method with the tool 77 pushing inward from the notches 76 on both sides of the positioning end and the convex extension control piece 75 have the following defects:

1. In order for the positioning hole 73 of the positioning end of the disc-shaped alloy plate 7 to be condensed and correctly positioned on the rivet column 78, there must be notches 76 on the two outer sides of the positioning end. The positioning point is drifting and there is no synchronous aperture on the lugs for following the riveting point, and then affect the accuracy.
2. The positioning notch 76 is set in the deformation zone (outside), so that defects are generated in the deformation zone and the integrity of the overall structure is destroyed to produce a breakpoint of deformation curvature, which affects its service life and overall structure strength.
3. The positioning notch 76 is set in the deformation zone, and moves from the outside to the inside during the contraction, so that make the internal structure stress reorganization caused by the movement near the gap, and the escape curve is unstable.
4. Because the outer angle of the tool 77 and the inner angle of the notch 76 only have one-way movement and positioning, the matching error makes it difficult for the positioning hole 73 and the rivet column 78 to accurately position and condense, and further affect the accuracy of its bounce.
5. The convex extension control piece 75 extends beyond the smooth free end, causing uneven impedance and detrimental to the disc-shaped synchronous temperature rise trip, causing the trip curve offset error to be too large, reaching >150%.

SUMMARY OF THE INVENTION

A primary object of the present invention is to provide a manufacture method of a concave disc-shaped structure of bimetal strip that does not damage its internal stress structure, can increase the service life, and can accurately calculate the amperage of the overload current by using the formula V=IR and W=VA to reduce the product defect rate and facilitate the calculation and analysis of the overload trip current.

To achieve the objects mentioned above, the present invention comprises: a). providing a bimetal strip, after stamping the bimetal strip has a positioning end, a free end corresponding to the positioning end, and a connecting lever extending inward from the free end, at the end of the connecting lever has a through hole, and the through hole has a connecting point, and an appropriate gap is cut at the center of the positioning end, and two symmetrical positioning holes are provided at the positioning ends on both sides of the gap, and two symmetrical assembling hole are provided outside the symmetrical positioning holes, and the center distance of the two symmetric positioning holes is D1, and the center distance of the two symmetric assembling holes is D2; b). providing a lug, after stamping the lug has a connecting pin, a combining surface connecting to the connecting pin, the combining surface has a connecting hole for penetration, and the outside of the connecting hole has two symmetrical rivets, define the width of the left and right sides of the connecting hole as W3, the center distance of the two symmetrical rivets is D4, and the D4 is smaller than D2; c). providing an assembling jig, the assembling jig includes a base seat, a first guiding pin and a second guiding pin parallelly arranged on the base seat, the center distance of the first guiding pin and the second guiding pin is D3, the width of the two outer edges of the first guiding pin and the second guiding pin is smaller than the width W3 of the connecting hole, and the base seat is provided with two protruding columns below the two symmetrical rivets of the lug, the protruding columns is used for positioning the bottom edge of the rivets and bearing the punching of the guiding hole of punch, so that the bimetal strip and the lug are smoothly riveted and combined; d). Sleeve the connecting hole of the lug into the first guiding pin and the second guiding pin, and make the bottom of the combining surface against the surface of the base seat; e). Sleeve the positioning hole of the bimetal strip into the first guiding pin and the second guiding pin from the top, making the bimetal strip arrange above the first guiding pin and the second guiding pin; f). providing a compression module, arranged above the first guiding pin and the second guiding pin, the axial direction is provided with a shaft hole for the first guiding pin and the second guiding pin to extend, and two guiding hole of punch arranged on the outside of the two shaft holes, the compression module is sleeved into the first guiding pin and the second guiding pin from top to bottom, and then the bimetal strip is pressed down to make the two symmetrical positioning holes gradually turn inward to condense to the combining surface of the lug, further narrow the center distance D1 of the positioning holes of the bimetal strip to be equidistant from the center distance D3 of the first guiding pin and the second guiding pin, and narrow the center distance D2 of the two symmetrical assembling hole to D4 which is the same as the center distance of the two symmetrical rivets, and sleeve into the two symmetrical rivets, and use the two guiding holes of punch of the compression module, punch the riveting to deform it, and then riveting and bonding the bimetal strip and the lug; g). Raise the compression module, and the bimetal strip and the lug are removed upward from the assembling jig; and h). Form a concave disc-shaped structure of bimetal strip.

Also, the first guiding pin has a peak, and has a guiding surface inclined from top to bottom to inward from the peak.

Also, the second guiding pin has a peak, and has a guiding surface inclined from top to bottom to inward from the peak.

Also, the connecting hole on the lug includes two symmetrical rectangular holes, the distance W3 between the left and right sides of the rectangular holes is greater than the outer edges of the first guiding pin and the second guiding pin, so that the first guiding pin and the second guiding pin can respectively extend through the two rectangular holes.

Also, the connecting hole on the lug includes a long hole, the distance W3 between the left and right sides of the long hole is greater than the outer edges of the first guiding pin and the second guiding pin, so that the first guiding pin and the second guiding pin can respectively extend through the long hole.

With the features disclosed above, the prior art has the notch 76 located on the outer edge of the alloy plate 7 for inward movement, the notch 76 is aligned with the guide blade seat and pushed inwardly when pressed parallel, so that the positioning hole 73 at the inner edge enters the rivet column 78 for riveting and positioning. The present invention is different that having a displaceable positioning hole located on the inner edge arranged on two guiding pins, and the guiding surface is used to condense during pressing down so that the assembling hole at the outer edge can be inserted into the rivet to be riveted and combined for positioning.

With the features disclosed above, the present invention has below features:

1. The assembling hole is located on the outer edge and can take a wider pressing distance. Because the outer edge has a smaller stroke when the two-way jump, and because there is no notch on the outer edge and no extra convex extension control piece at the free end, the entire area can be quickly deformed when the temperature rises, so the drift error of over-current tripping reduces from 150% to below 135%, improving the sensitivity and achieving the purpose of fast disconnection.
2. Because the condensed structure is changed to the inside of the disc-shaped condensed structure, the disc-shaped stress structure will not be changed due to the improper stress generated during the condensation, and the trip time will be changed, so the internal stress structure will not be damaged, which can improve the service life, and can be accurately used to set the amperage of the overload current by using the formulas V=IR and W=VA to reduce the product defect rate and increase the accuracy of the overload trip current.
3. Condensation adopts the closed hole and the columnar body method to combine positioning, which is more accurate and firmer than the prior art using the unclosed notch and the guide blade to condense, and can have a higher condensation yield.

DETAILED DESCRIPTION OF THE PREFERRED EMBODIMENT

Figure 1A:
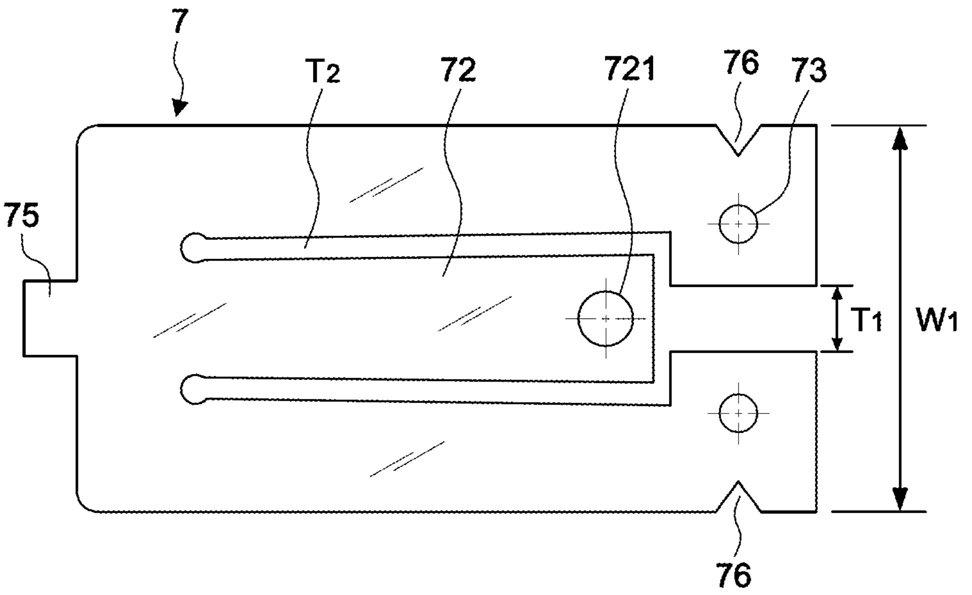
FIG.1A PRIOR ART
FIG. 1A is s a schematic diagram of a bimetal strip before condensation according to the prior art.
Figure 1B:
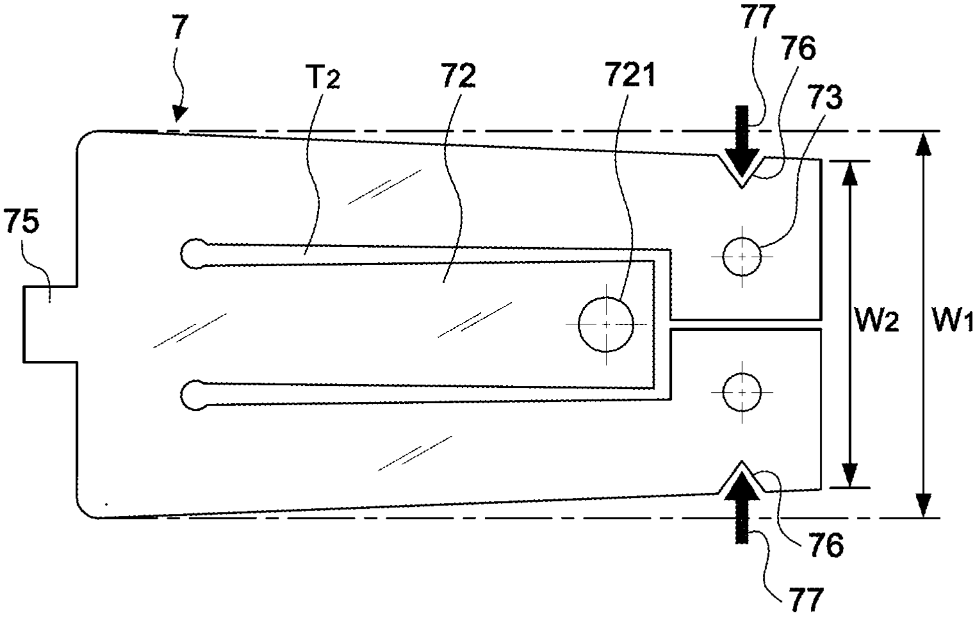
FIG.1B PRIOR ART
FIG. 1B is s a schematic diagram of a bimetal strip during condensation according to the prior art.
Figure 2A:
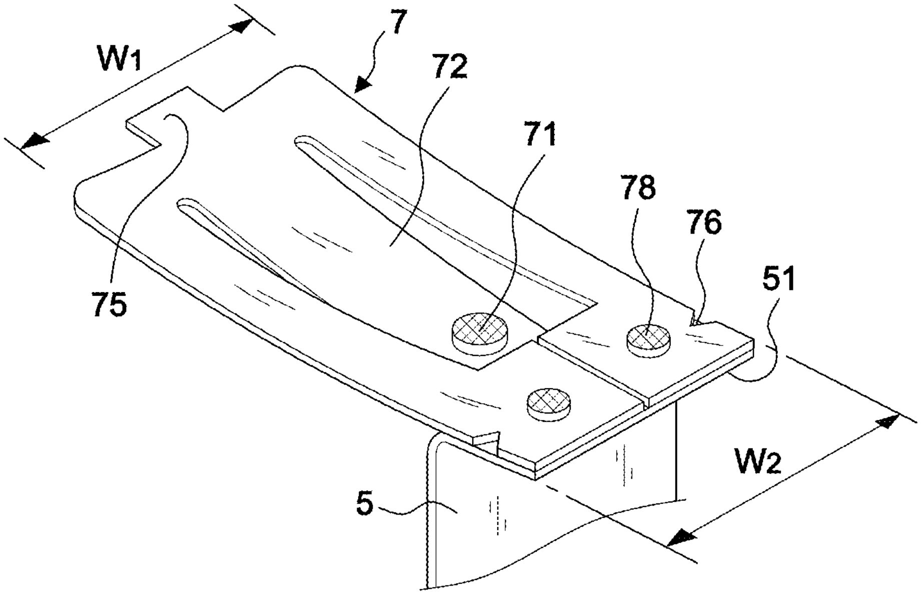
FIG.2A PRIOR ART
FIG. 2A is an assembly perspective view of the condensed bimetal strip according to the prior art.
Figure 2B:
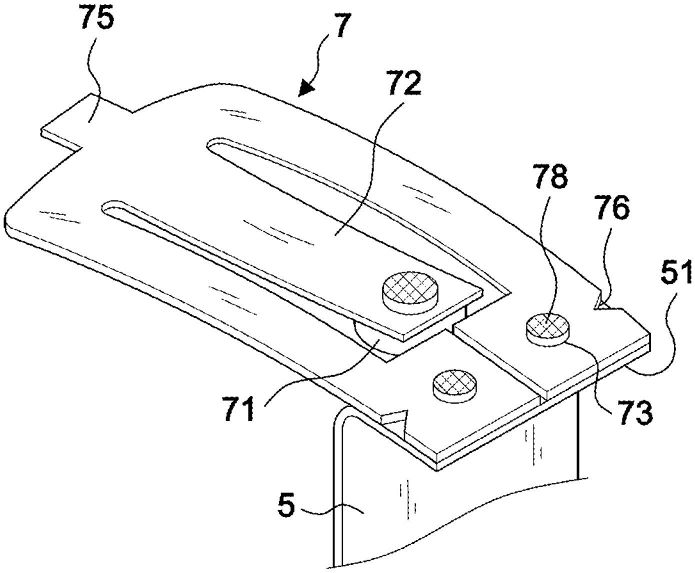
FIG.2B PRIOR ART
FIG. 2B is another assembly perspective view of the condensed bimetal strip according to the prior art.
Figure 3A:
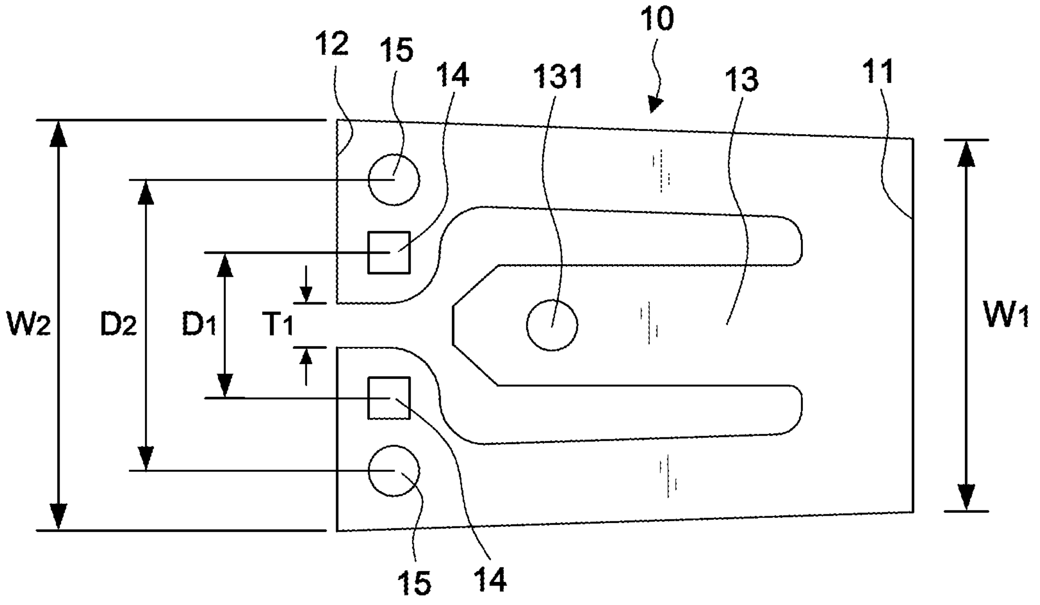
FIG. 3A is a schematic diagram of a bimetal strip before condensation of the present invention.
Figure 6:
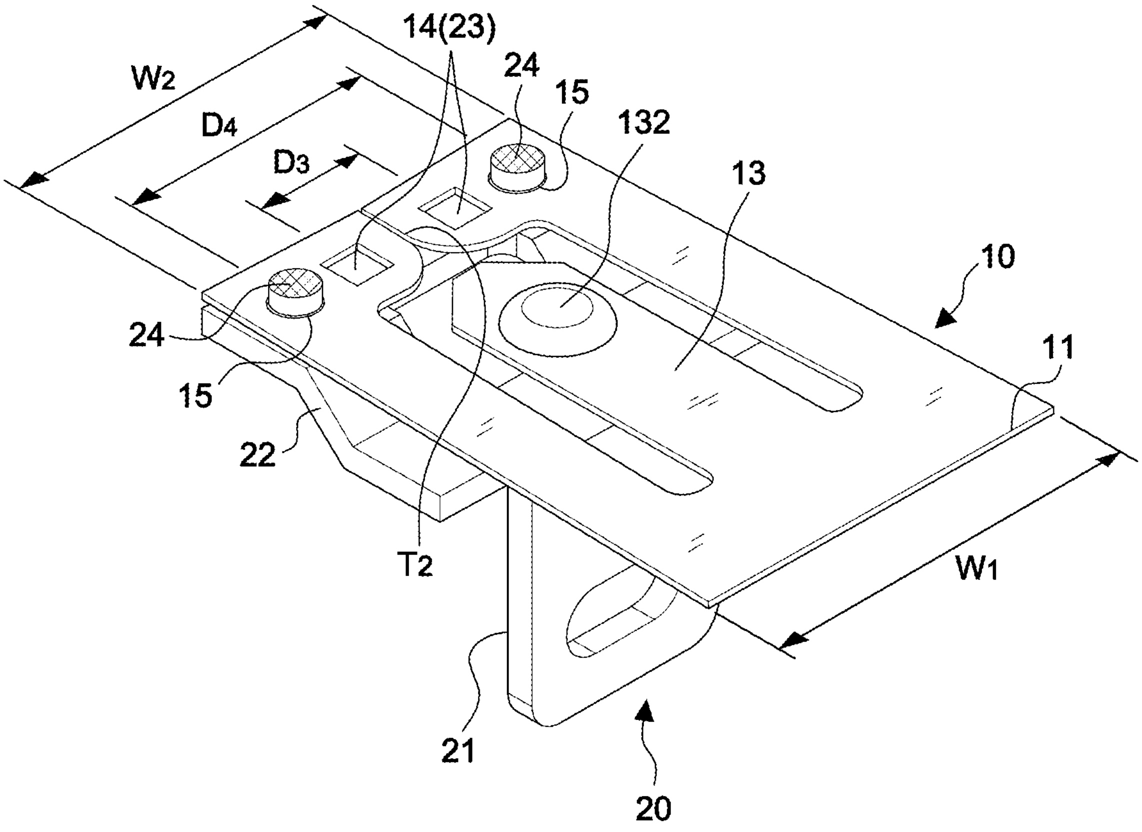
FIG. 6 is a perspective view of the bimetal strip after assembling and condensation of the present invention.

Referring to FIGS. 3-6, the manufacture method of a concave disc-shaped structure of bimetal strip, comprising:

a). as FIG. 3A showing, providing a bimetal strip 10, after stamping the bimetal strip 10 has a positioning end 12, a free end 11 corresponding to the positioning end 12, and a connecting lever 13 extending inward from the free end 11, at the end of the connecting lever 13 has a through hole 131, and the through hole 131 has a connecting point 132, as FIG. 6 showing, and an appropriate gap T1 is cut at the center of the positioning end 12, and two symmetrical positioning holes 14 are provided at the positioning ends 12 on both sides of the gap T1, and two symmetrical assembling hole 15 are provided outside the symmetrical positioning holes 14, and the center distance of the two symmetric positioning holes 14 is D1, and the center distance of the two symmetric assembling holes 15 is D2. In this embodiment, the width of the positioning end 12 of the bimetal strip 10 is greater than the width W1 of the free end 11.

b). providing a lug 20, after stamping the lug 20 has a connecting pin 21, a combining surface 22 connecting to the connecting pin 21, the combining surface 22 has a connecting hole 23 for penetration, and the outside of the connecting hole 23 has two symmetrical rivets 24, define the width of the left and right sides of the connecting hole 23 as W3, the center distance of the two symmetrical rivets 24 is D4, and the D4 is smaller than D2.

Figure 4:
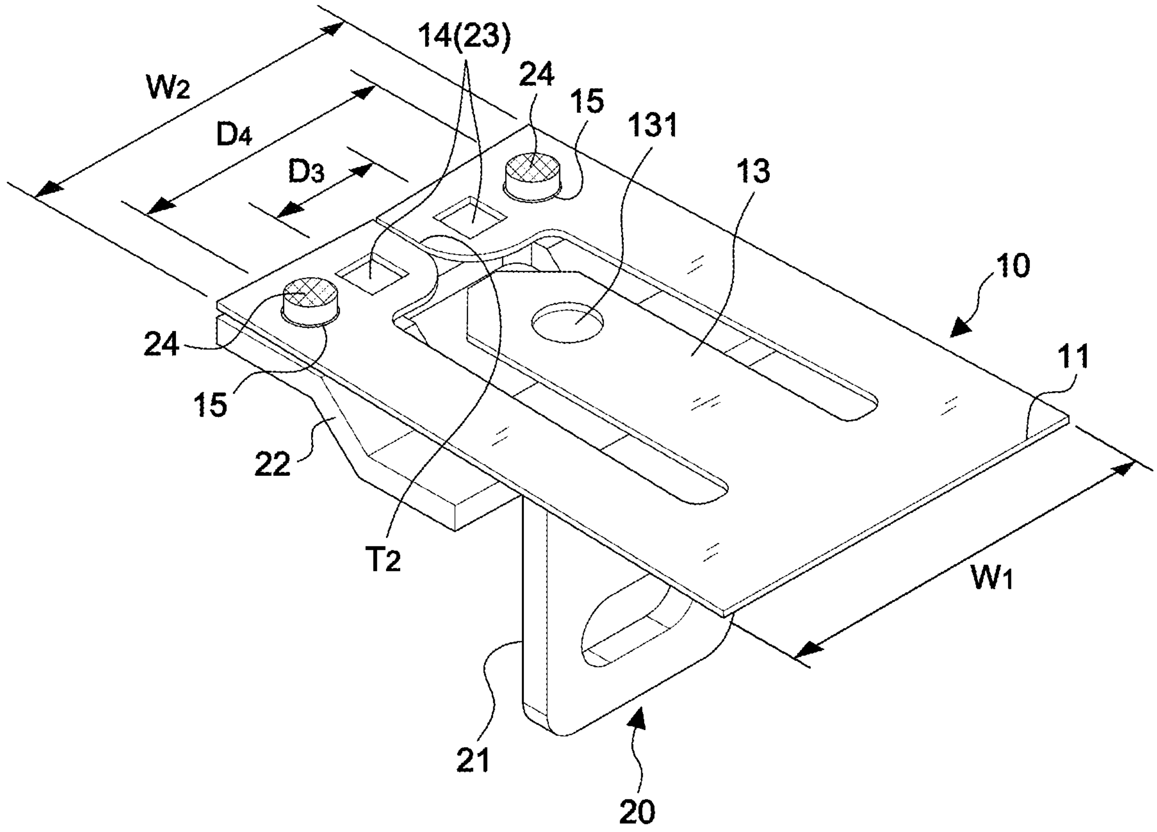
FIG. 4 is an assembly view of the bimetal strip and the lug after condensation of the present invention.

FIG. 4 shows the assembly prospective view of the bimetal strip 10 and the lug 20 after condensation. And the following step will further explain how to condense the bimetal strip 10 to disc-shaped structure.

c). as FIG. 5 showing, providing an assembling jig 30, the assembling jig 30 includes a base seat 31, a first guiding pin 32 and a second guiding pin 33 parallelly arranged on the base seat 31, having two peak 321/331, and having guiding surfaces 322/332 inclined from top to bottom to inward from the peak 321/331; the center distance of the first guiding pin 32 and the second guiding pin 33 is D3, the width of the two outer edges of the first guiding pin 32 and the second guiding pin 33 is smaller than the width W3 of the connecting hole 23 for letting the first guiding pin 32 and the second guiding pin 33 to set through.

Figure 3B:
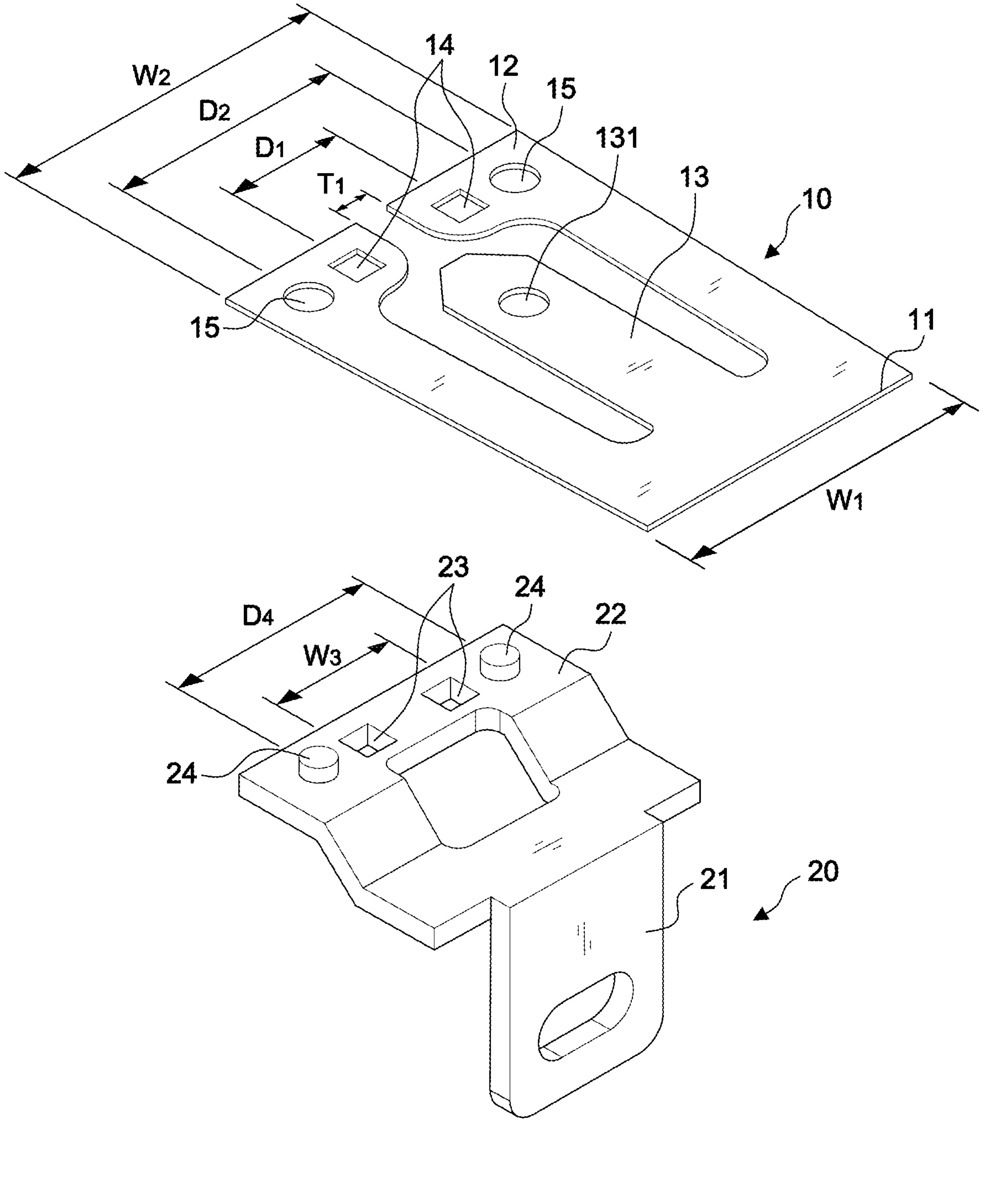
FIG. 3B is an exploded view of the bimetal strip and the lug before condensation of the present invention.
Figure 3C:
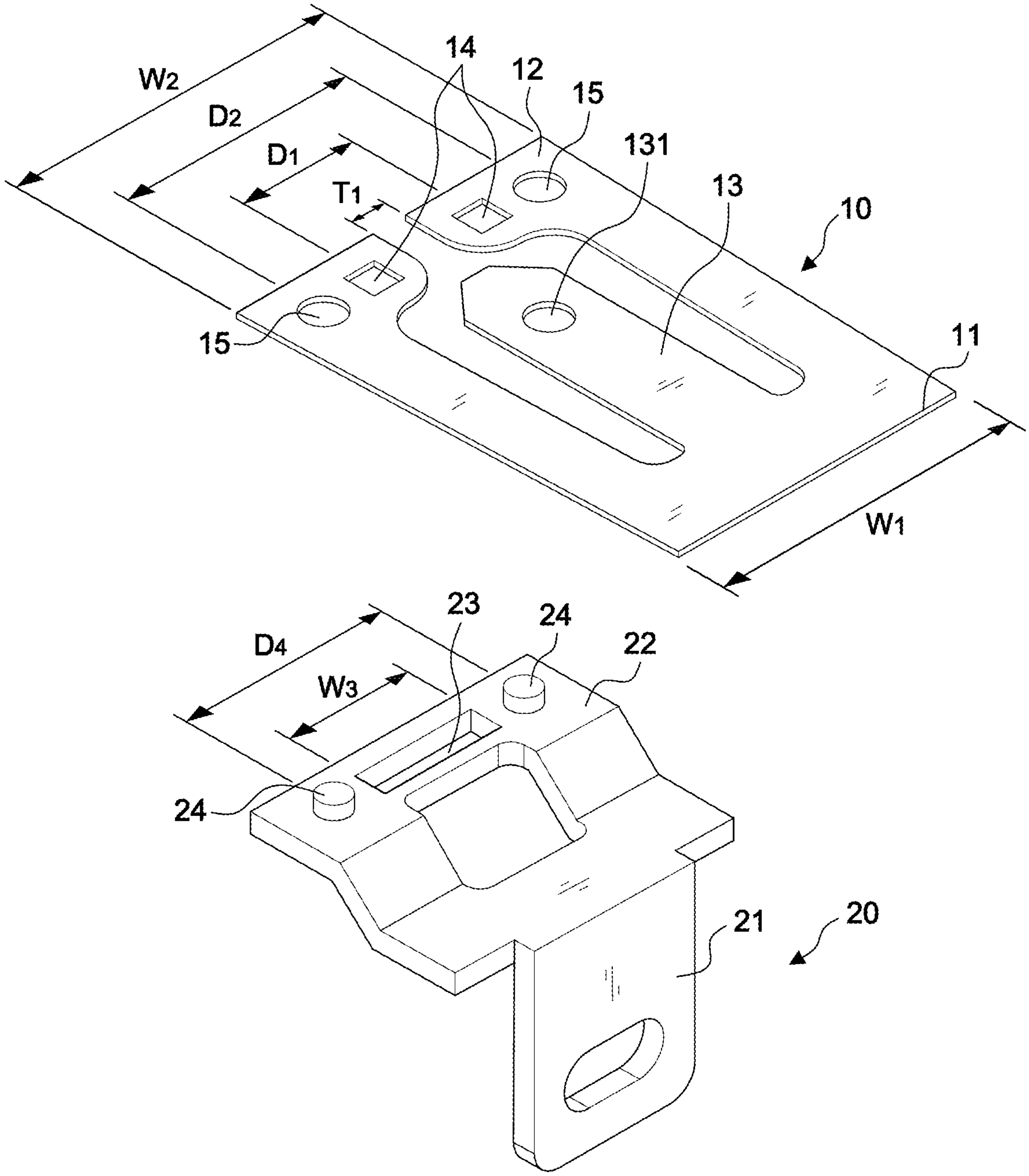
FIG. 3C is a perspective view of the preferred embodiment of the lug of the present invention.
Figure 5A:
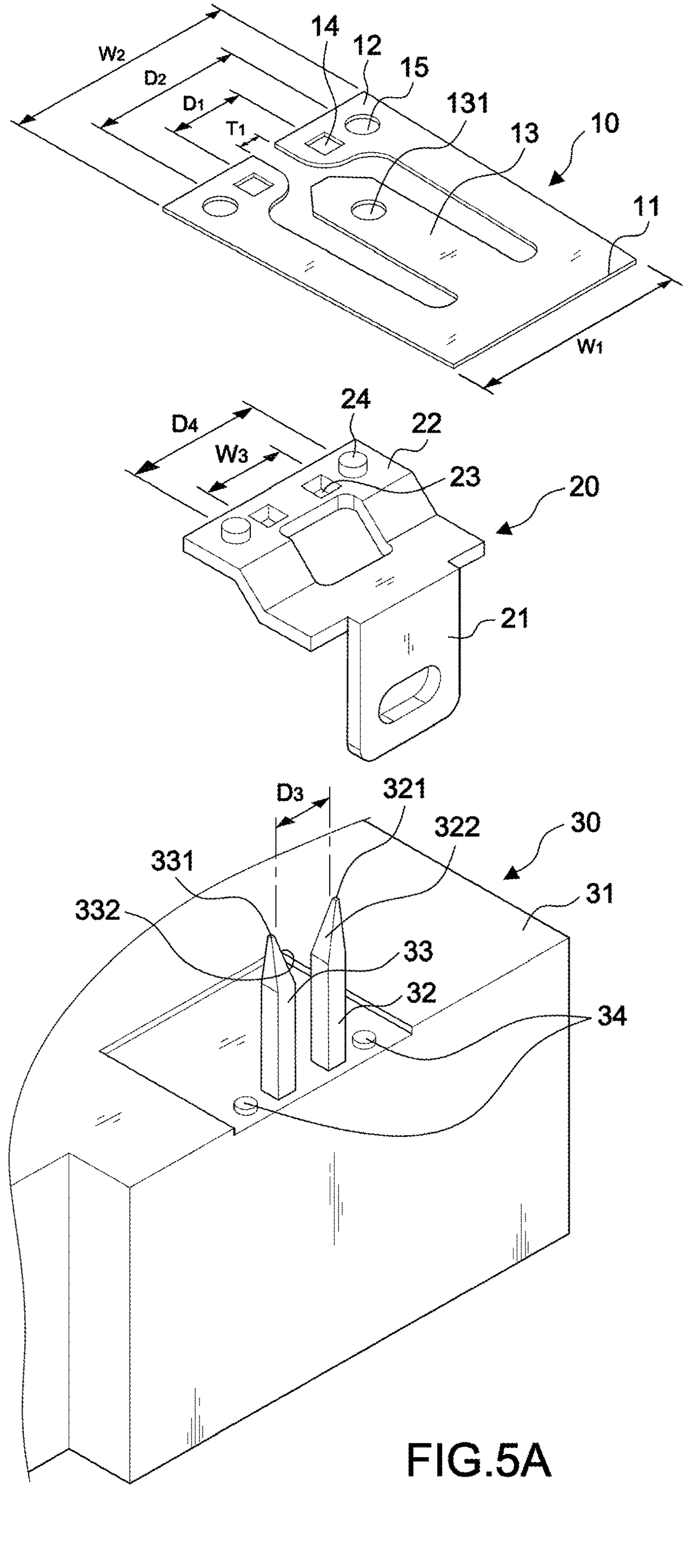
FIG. 5A is a schematic diagram illustrating the first step of assembling and condensation of the bimetal strip of the present invention.
Figure 5B:
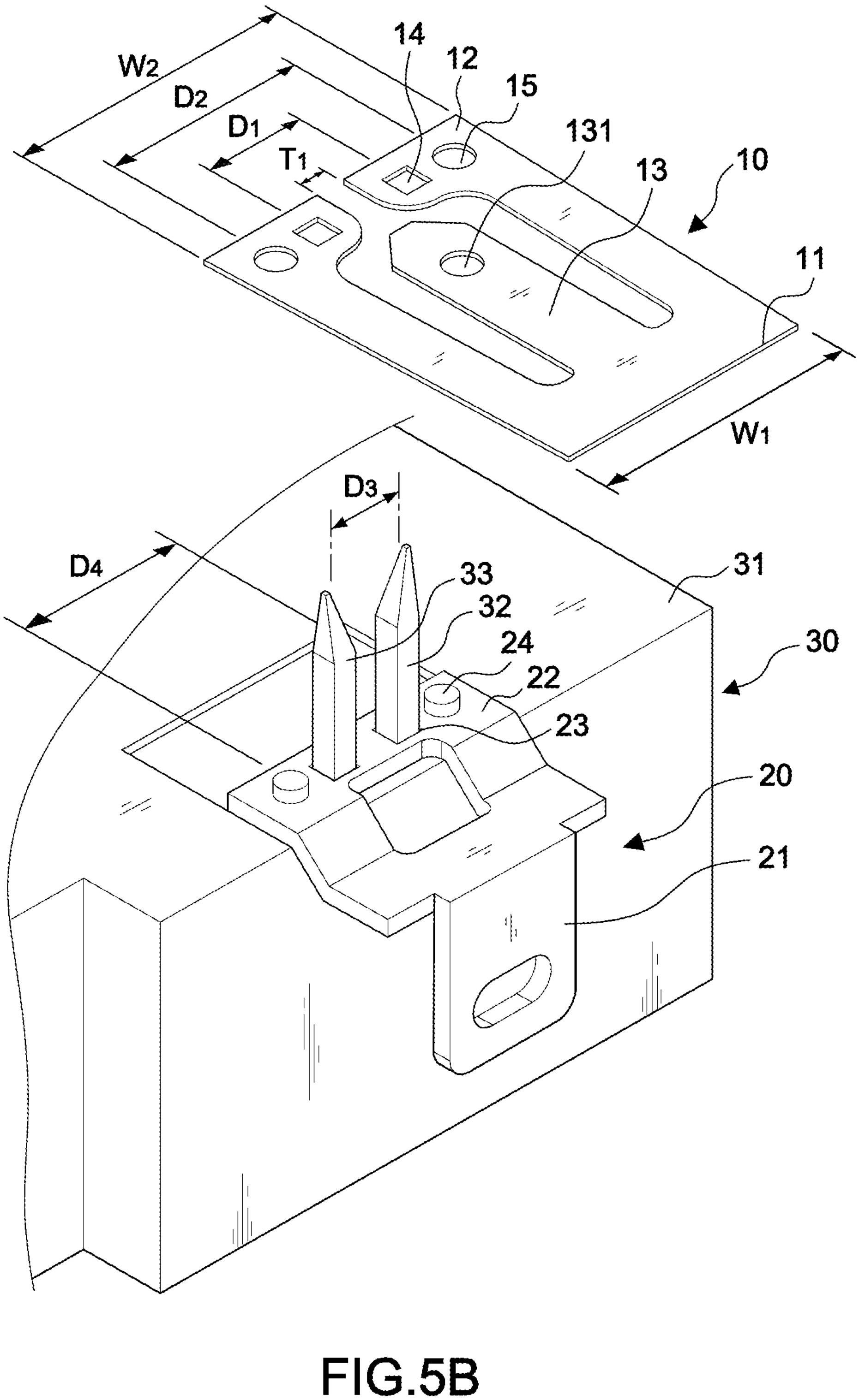
FIG. 5B is a schematic diagram illustrating the second step of assembling and condensation of the bimetal strip of the present invention.
Figure 5C:
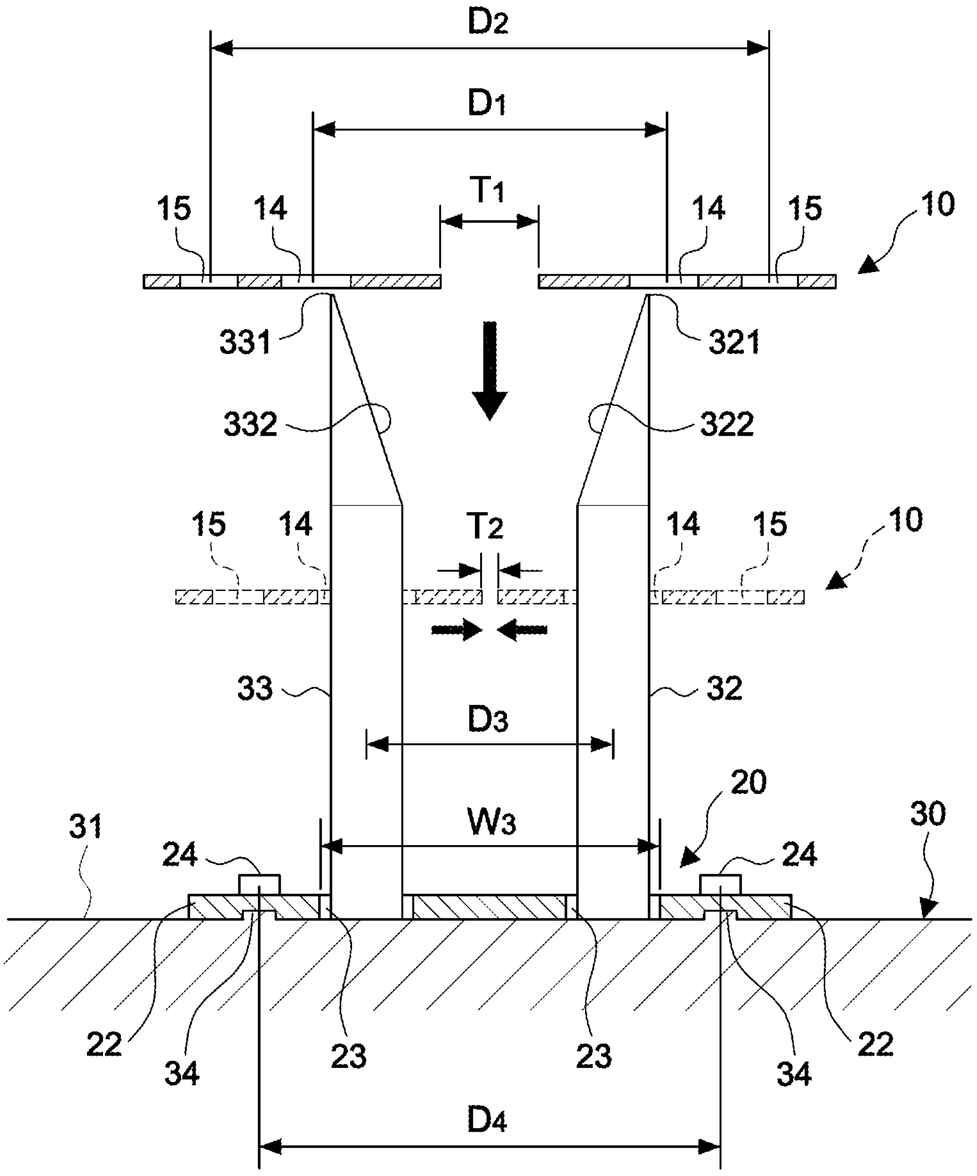
FIG. 5C is a schematic diagram illustrating the third step of assembling and condensation of the bimetal strip of the present invention.

As FIG. 3B showing, in this embodiment, the connecting hole 23 on the lug 20 includes two symmetrical rectangular holes, the distance W3 between the left and right sides of the rectangular holes is greater than the outer edges of the first guiding pin 32 and the second guiding pin 33, so that the first guiding pin 32 and the second guiding pin 33 can respectively extend through the two rectangular holes. As FIG. 3C showing, in another embodiment, the connecting hole 23 on the lug 20 includes a long hole, the distance W3 between the left and right sides of the long hole is greater than the outer edges of the first guiding pin 32 and the second guiding pin 33, so that the first guiding pin 32 and the second guiding pin 33 can respectively extend through the long hole. Therefore, the connecting hole 23 on the lug 20 can be one or two, as long as the first guiding pin 32 and the second guiding pin 33 can penetrate and extend.

d). as FIG. 5B showing, sleeve the connecting hole 23 of the lug 20 into the first guiding pin 32 and the second guiding pin 33, and make the bottom of the combining surface 22 against the surface of the base seat 31.

e). as FIG. 5C showing, using the guiding surfaces 322/332 of the two peak 321/331 to sleeve the positioning hole 14 of the bimetal strip 10 into the first guiding pin 32 and the second guiding pin 33 from the top, making the inner side of the positioning hole 14 of the bimetal strip 10 arrange at two peak 321/331 of the first guiding pin 32 and the second guiding pin 33; the center distance of the positioning hole 14 is D1; the main feature of the present invention is that using the guiding surfaces 322/332 of the two peak 321/331 of the first guiding pin 32 and the second guiding pin 33 arranged at the displaceable inner side of the positioning hole 14, during pressing down, the bimetal strip 10 condense from D1 to D3, and further make the distance of the assembling hole 15 at the outer edge condense from D2 to D4, and sleeve into the rivet 24 for combining and positioning.

Figure 5D:
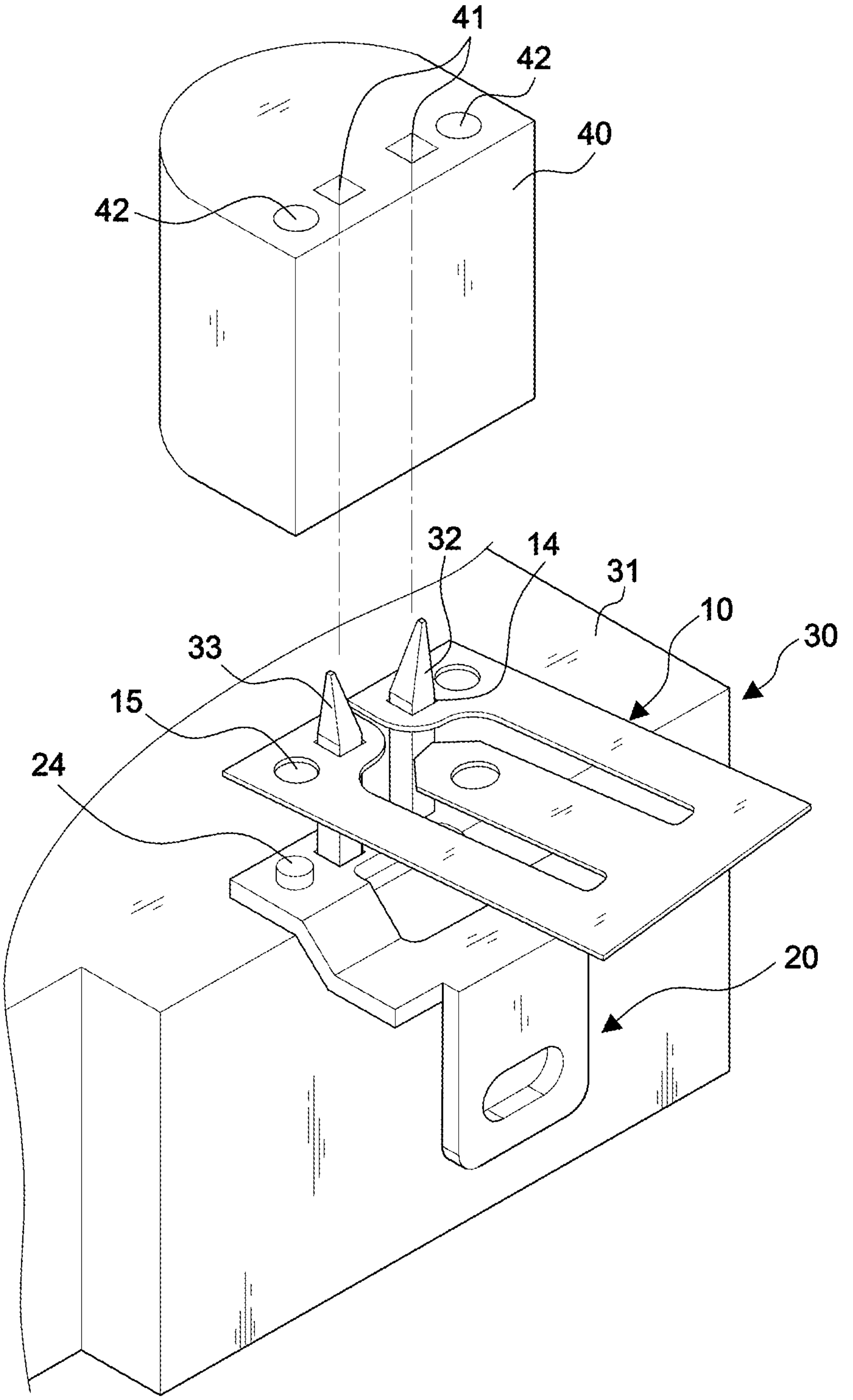
FIG. 5D is a schematic diagram illustrating the fourth step of assembling and condensation of the bimetal strip of the present invention.
Figure 5E:
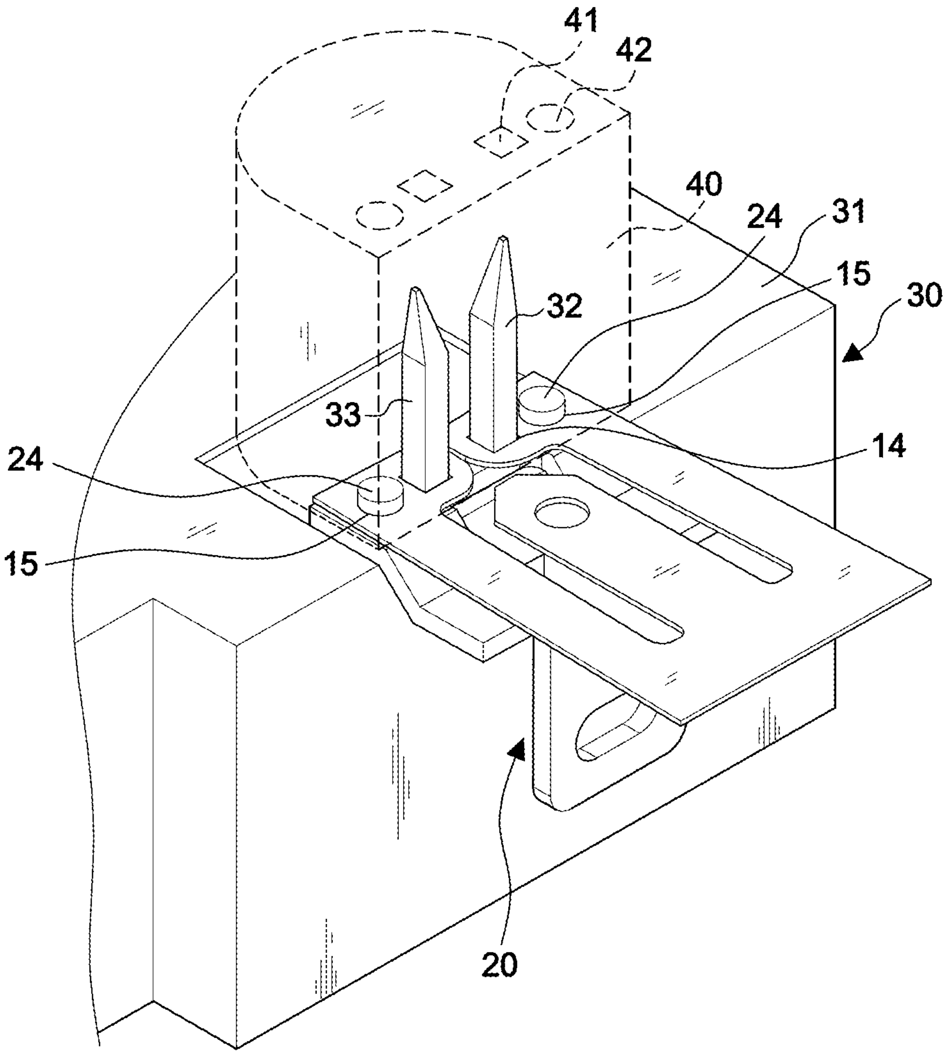
FIG. 5E is a schematic diagram illustrating the fifth step of assembling and condensation of the bimetal strip of the present invention.

In this embodiment, the guiding surfaces 322/332 inclined from top to bottom to inward from the peak 321/331, making the symmetrical positioning holes 14 of the bimetal strip 10 close inward. Moreover, in this embodiment, the first guiding pin 32 and the second guiding pin 33 have same heights, but not limit to this application. In other words, the first guiding pin 32 and the second guiding pin 33 can have different heights, and the positioning hole 14 can be condensed and assembled by using the height difference.

f). as FIG. 5D showing, providing a compression module 40, arranged above the first guiding pin 32 and the second guiding pin 33, the axial direction is provided with a shaft hole 41 for the first guiding pin 32 and the second guiding pin 33 to extend, and two guiding hole 42 of punch arranged on the outside of the two shaft holes 41, the compression module 40 is sleeved into the first guiding pin 32 and the second guiding pin 33 from top to bottom, and then the bimetal strip 10 is pressed down to make the two symmetrical positioning holes 14 gradually turn inward to condense to the combining surface 22 of the lug 20, further narrow the center distance D1 of the positioning holes 14 of the bimetal strip 10 to be equidistant from the center distance D3 of the first guiding pin 32 and the second guiding pin 33, and narrow the center distance D2 of the two symmetrical assembling hole 15 to D4 which is the same as the center distance of the two symmetrical rivets 24, and sleeve into the two symmetrical rivets 24, and use the two guiding holes 42 of punch of the compression module 40, punch the riveting 24 to deform it, and then riveting and bonding the bimetal strip 10 and the lug 20; in this embodiment, the base seat 31 is provided with two protruding columns 34 below the two symmetrical rivets 24 of the lug 20, the protruding columns 34 is used for positioning the bottom edge of the rivets 24 and bearing the punching of the guiding hole 42 of punch, so that the bimetal strip 10 and the lug 20 are smoothly riveted and combined.

g). Raise the compression module 40, and the bimetal strip 10 and the lug 20 are removed upward from the assembling jig 30.

h). Form a concave disc-shaped structure of bimetal strip 10, as FIG. 4 showing.

Finally, FIG. 6 is a perspective view of the bimetal strip after assembling and condensation of the present invention, after forming a disc-shaped structure of bimetal strip 10, arrange a connecting point 132 on the trough hole 131 of the tail ends of the connecting lever 13.

With the feature disclosed above, after the bimetal strip 10 and the lug 20 are combined and positioned by the above method, then an overload switch is formed in the case (not showing in the drawing). However, the overload switch is a conventional art, so the detail need not to be mentioned.

The main difference is the assembling method of the bimetal strip 10 and the lug 20, the difference between the present invention and the prior art is shown in the following table:

| | prior art | present invention |
|---|---|---|
| 1 | In order for the positioning hole 73 of the positioning end of the disc-shaped alloy plate 7 to be condensed and correctly positioned on the rivet column 78, there must be notches 76 on the two outer sides of the positioning end. The positioning point is drifting and there is no synchronous aperture on the lugs for following the riveting point, and then affect the accuracy. | The bimetal strip 10 use the two positioning holes 14 to condense to the combining surface 22 of the lug 20, use the two guiding pin of the assembling jig 30 to coaxially guide the precise positioning of the two joints, and make the rivet 24 and the assembling hole 15 accurately riveted. |
| 2 | The positioning notch 76 is set in the deformation zone (outside), so that defects are generated in the deformation zone and the integrity of the overall structure is destroyed to produce a breakpoint of deformation curvature, which affects its service life and overall structure strength. | The bimetal strip 10 is not damaged, so the overall structure is strong, the service life is longer. |
| 3 | The positioning notch 76 is set in the deformation zone, and moves from the outside to the inside during the contraction, so that the internal structure stress reorganization caused by the movement near the gap, and the escape curve is unstable. | The bimetal strip 10 is condensed "from the inside to the inside", and the positioning hole is set outside (inside) the deformation zone. When condensing, stretching inward only changes the stress outside the shape zone (inner edge), but does not change the stress in the deformation zone, the trip curve is more stable. Due to there is no effect of stress and the improvement of combination accuracy, the drift error between trips can be reduced from 150% to less than 135%. |
| 4 | Because the outer angle of the tool 77 and the inner angle of the notch 76 only have one-way movement and positioning, the matching error makes it difficult for the positioning hole 73 and the rivet column 78 to accurately position and condense., and further affect the accuracy of its bounce. | When the displaceable positioning hole 14 is pressed down by the two guiding pins 32/33, the bimetal strip 10 is condensed from D1 to D3, and the distance D2 of the assembling hole 15 on the outer edge can be narrowed to D4. The rivet 24 is riveted and pressed and combined with positioning, which has the effect of accurate positioning. |
| 5 | The convex extension control piece 75 extends beyond the smooth free end, causing uneven impedance and detrimental to the disc-shaped synchronous temperature rise trip, causing the trip curve offset error. | There is no convex extension control piece, and the deformation and curvature of the bimetal strip 10 is kept smooth, and the resistance value of the bimetal strip 10 is consistent, which makes the trip more stable. |

With the above mentioned features, the present invention has below benefits:

1. The assembling hole is located on the outer edge and can take a wider pressing distance. Because the outer edge has a smaller stroke when the two-way jump, and because there is no notch on the outer edge and no extra convex extension control piece at the free end, the entire area can be quickly deformed when the temperature rises, so the drift error of over-current tripping reduces from 150% to below 135%, improving the sensitivity and achieving the purpose of fast disconnection.
2. Because the condensed structure is changed to the inside of the disc-shaped condensed structure, the disc-shaped stress structure will not be changed due to the improper stress generated during the condensation, and the trip time will be changed, so the internal stress structure will not be damaged, which can improve the service life, and can be accurately used to set the amperage of the overload current by using the formulas V=IR and W=VA to reduce the product defect rate and increase the accuracy of the overload trip current.
3. Condensation adopts the closed hole and the columnar body method to combine positioning, which is more accurate and firmer than the prior art using the unclosed notch and the guide blade to condense, and can have a higher condensation yield.

Although particular embodiments of the invention have been described in detail for purposes of illustration, various modifications and enhancements may be made without departing from the spirit and scope of the invention. Accordingly, the invention is not limited except as by the appended claims.

What is claimed is:

1. A method of manufacturing a concave disc-shaped structure of bimetal strip that operatively associated with an assembling jig and a compression module, said method comprising:

providing a bimetal strip material, and stamping the bimetal strip material to form the bimetal strip, wherein the formed bimetal strip has a positioning end, a free end corresponding to the positioning end, and a connecting lever extending inward from the free end, wherein an end of the connecting lever has a through hole, and the through hole has a connecting point, and an appropriate gap is cut at the center of the positioning end, and two symmetrical positioning holes are provided on both sides of the gap at the positioning end, and two symmetrical assembling hole are provided outside the symmetrical positioning holes, and the center distance D1 of the two symmetric positioning holes, and the center distance D2 of the two symmetric assembling holes;

stamping the bimetal strip material to form a lug, wherein the lug has a connecting pin, a combining surface connecting to the connecting pin, the combining surface has a connecting hole for penetration, an outside of the connecting hole has two symmetrical rivets, define the width W3 of the left and right sides of the connecting hole, the center distance D4 of the two symmetrical rivets is smaller than the center distance D2 of the two symmetrical rivets;

providing the assembling jig, the assembling jig includes a base seat, a first guiding pin and a second guiding pin parallelly arranged on the base seat, the center distance D3 of the first guiding pin and the second guiding pin, a width of the two outer edges of the first guiding pin and the second guiding pin is smaller than the width W3 of the left and right sides of the connecting hole, and the base seat is provided with two protruding columns below the two symmetrical rivets of the lug, the two protruding columns are used for positioning the bottom edge of the rivets and bearing the punching of the guiding hole of punch, so that the bimetal strip and the lug are smoothly riveted and combined;

sleeve the connecting hole of the lug into the first guiding pin and the second guiding pin, and make the bottom of the combining surface against the surface of the base seat;

sleeve the positioning hole of the bimetal strip into the first guiding pin and the second guiding pin from the top, making the bimetal strip arrange above the first guiding pin and the second guiding pin;

providing a compression module, arranged above the first guiding pin and the second guiding pin, the axial direction is provided with a shaft hole for the first guiding pin and the second guiding pin to extend, and two guiding hole of punch arranged on the outside of the two shaft holes, the compression module is sleeved into the first guiding pin and the second guiding pin from top to bottom, and then the bimetal strip is pressed down to make the two symmetrical positioning holes gradually turn inward to condense to the combining surface of the lug, further narrow the center distance D1 of the positioning holes of the bimetal strip to be equidistant from the center distance D3 of the first guiding pin and the second guiding pin, and narrow the center distance D2 of the two symmetrical assembling holes to the center distance D4 of the two symmetrical rivets, and sleeve into the two symmetrical rivets, and use the two guiding holes of punch of the compression module, punch the riveting to deform it, and then riveting and bonding the bimetal strip and the lug; and removing the bimetal strip and the lug by raising the compression module upward from the assembling jig to obtain the concave disc-shaped structure of bimetal strip.

2. The method of manufacturing the concave disc-shaped structure of bimetal strip according to claim 1, wherein the first guiding pin of the assembling jig includes a peak, and has a guiding surface inclined from top to bottom to inward from the peak.

3. The method of manufacturing the concave disc-shaped structure of bimetal strip according to claim 1, wherein the second guiding pin of the assembling jig includes a peak, and has a guiding surface inclined from top to bottom to inward from the peak.

4. The method of manufacturing the concave disc-shaped structure of bimetal strip according to claim 1, wherein the connecting hole on the lug includes two symmetrical rectangular holes, the distance W3 between the left and right sides of the rectangular holes is greater than the outer edges of the first guiding pin and the second guiding pin, so that the first guiding pin and the second guiding pin can respectively extend through the two rectangular holes.

5. The method of manufacturing the concave disc-shaped structure of bimetal strip according to claim 1, wherein the connecting hole on the lug includes a long hole, the distance W3 between the left and right sides of the long hole is greater than the outer edges of the first guiding pin and the second guiding pin, so that the first guiding pin and the second guiding pin can respectively extend through the long hole.

* * * * *